United States Patent
Parkhomenko et al.

(10) Patent No.: US 9,386,266 B2
(45) Date of Patent: Jul. 5, 2016

(54) METHOD AND APPARATUS FOR INCREASING FRAME RATE OF AN IMAGE STREAM USING AT LEAST ONE HIGHER FRAME RATE IMAGE STREAM

(71) Applicant: LSI Corporation, San Jose, CA (US)

(72) Inventors: Denis V. Parkhomenko, Moscow (RU); Ivan L. Mazurenko, Moscow (RU); Pavel A. Aliseychik, Moscow (RU); Dmitry N. Babin, Moscow (RU); Denis V. Zaytsev, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 116 days.

(21) Appl. No.: 14/237,436

(22) PCT Filed: Aug. 23, 2013

(86) PCT No.: PCT/US2013/056402
§ 371 (c)(1),
(2) Date: Feb. 6, 2014

(87) PCT Pub. No.: WO2014/120281
PCT Pub. Date: Aug. 7, 2014

(65) Prior Publication Data
US 2014/0362289 A1   Dec. 11, 2014

(30) Foreign Application Priority Data
Jan. 30, 2013 (RU) ................. 2013102854

(51) Int. Cl.
*H04N 7/01* (2006.01)
*H04N 11/20* (2006.01)
(Continued)

(52) U.S. Cl.
CPC ............ *H04N 7/0127* (2013.01); *G06K 9/6218* (2013.01); *H04L 65/602* (2013.01); *H04N 19/587* (2014.11)

(58) Field of Classification Search
CPC ...... H04N 7/0112; H04N 7/012; H04N 7/014
USPC ........................................................ 348/459
See application file for complete search history.

(56) References Cited

U.S. PATENT DOCUMENTS

| 5,808,617 A | 9/1998 | Kenworthy et al. |
| 6,031,573 A | 2/2000 | MacCormack et al. |

(Continued)

FOREIGN PATENT DOCUMENTS

WO   PCT/US2013/056402   2/2014

OTHER PUBLICATIONS

R. Nock et al., "Statistical Region Merging," IEEE Transactions on Pattern Analysis and Machine Intelligence, Nov. 2004, pp. 1452-1458, vol. 26, No. 11.

(Continued)

*Primary Examiner* — Michael Lee

(57) ABSTRACT

An image processing system comprises an image processor configured to obtain a first image stream having a first frame rate and a second image stream having a second frame rate lower than the first frame rate, to recover additional frames for the second image stream based on existing frames of the first and second image streams, and to utilize the additional frames to provide an increased frame rate for the second image stream. Recovering additional frames for the second image stream based on existing frames of the first and second image streams illustratively comprises determining sets of one or more additional frames for insertion between respective pairs of consecutive existing frames in the second image stream in respective iterations.

20 Claims, 6 Drawing Sheets

(51) Int. Cl.
*H04N 19/587* (2014.01)
*G06K 9/62* (2006.01)
*H04L 29/06* (2006.01)

(56) References Cited

U.S. PATENT DOCUMENTS

| | | | |
|---|---|---|---|
| 6,476,802 B1 | 11/2002 | Rose et al. | |
| 2004/0125103 A1 | 7/2004 | Kaufman et al. | |
| 2007/0081794 A1* | 4/2007 | Baynger et al. | 386/112 |
| 2007/0109298 A1 | 5/2007 | Elmieh et al. | |
| 2009/0167909 A1* | 7/2009 | Imagawa | G06T 3/4053 |
| | | | 348/262 |
| 2011/0122131 A1 | 5/2011 | Bruls et al. | |
| 2011/0310235 A1 | 12/2011 | Sasaki et al. | |
| 2012/0229460 A1 | 9/2012 | Fortin | |

OTHER PUBLICATIONS

D. Chan et al., "A Noise-Aware Filter for Real-Time Depth Upsampling," Workshop on Multi-Camera and Multi-Modal Sensor Fusion Algorithms and Applications, Oct. 2008, pp. 1-12, Marseille, France.

Wikipedia, "Motion Interpolation," http://en.wikipedia.org/wiki/Motion_interpolation, Jan. 2014, 4 pages.

* cited by examiner

METHOD AND APPARATUS FOR INCREASING FRAME RATE OF AN IMAGE STREAM USING AT LEAST ONE HIGHER FRAME RATE IMAGE STREAM

FIELD

The field relates generally to image processing, and more particularly to processing of multiple image streams having different frame rates.

BACKGROUND

Image processing is important in a wide variety of different machine vision applications, and such processing may involve multiple images of different types, possibly including both two-dimensional (2D) images and three-dimensional (3D) images, obtained from a variety of different image sources. For example, 2D images are provided by image sources such as video cameras and 3D images are provided by depth imagers such as structured light (SL) cameras or time of flight (ToF) cameras. Conventional image processing techniques therefore often require the processing of image streams from multiple distinct sources. However, problems can arise when the different sources generate images at different frame rates.

SUMMARY

In one embodiment, an image processing system comprises an image processor configured to obtain a first image stream having a first frame rate and a second image stream having a second frame rate lower than the first frame rate, to recover additional frames for the second image stream based on existing frames of the first and second image streams, and to utilize the additional frames to provide an increased frame rate for the second image stream. By way of example only, recovering additional frames for the second image stream based on existing frames of the first and second image streams may illustratively comprise determining sets of one or more additional frames for insertion between respective pairs of consecutive existing frames in the second image stream.

Other embodiments of the invention include but are not limited to methods, apparatus, systems, processing devices, integrated circuits, and computer-readable storage media having computer program code embodied therein.

DETAILED DESCRIPTION

Embodiments of the invention will be illustrated herein in conjunction with exemplary image processing systems that include image processors or other types of processing devices and implement techniques for increasing a frame rate of a depth image stream or other type of image stream using at least one higher rate image stream. It should be understood, however, that embodiments of the invention are more generally applicable to any image processing system or associated device or technique that involves processing multiple image streams having different frame rates.

Figure 1:
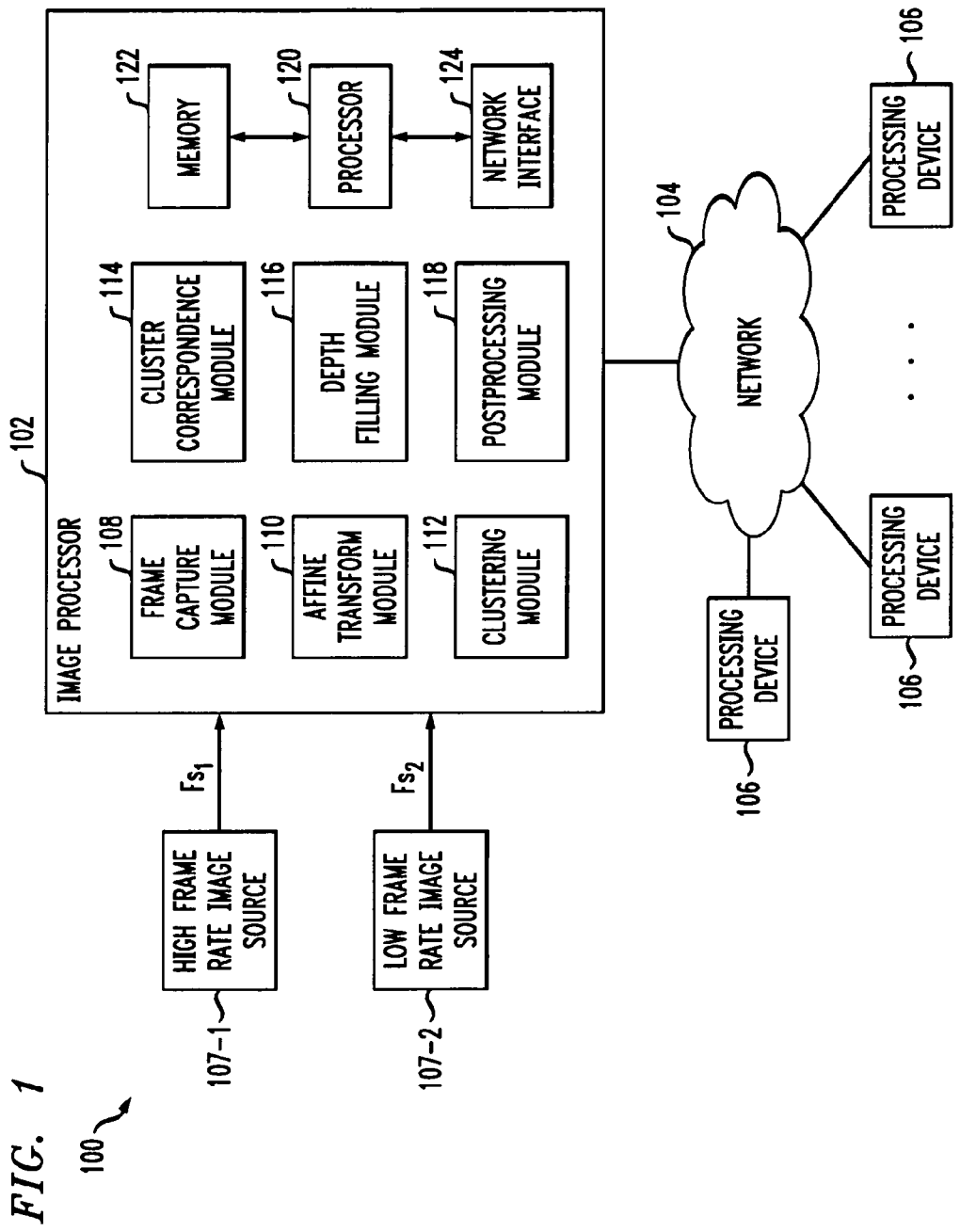
FIG. 1 is a block diagram of an image processing system in one embodiment.

FIG. 1 shows an image processing system 100 in an embodiment of the invention. The image processing system 100 comprises an image processor 102 that communicates over a network 104 with a plurality of processing devices 106. The image processor 102 receives at least two distinct image streams from respective image sources 107. More particularly, the image processor 102 receives from a high rate image source 107-1 a first image stream $Fs_1$ having a first frame rate, and receives from a low frame rate image source 107-2 a second image stream $Fs_2$ having a second frame rate lower than the first frame rate. The image sources 107 may be assumed without limitation to provide image streams taken from the same or similar viewpoints of a given scene, such that similar pixel clusters or other image segments may be present in both the high frame rate and low frame rate image streams. The terms "high" and "low" as applied to frame rates in this context are relative terms, and should not be construed as requiring any particular absolute frame rates.

By way of example, the high frame rate image source 107-1 may comprise a video camera or other video source providing a sequence of 2D images, and the low frame rate image source 107-1 may comprise a depth imager such as an SL camera or a ToF camera that provides a sequence of depth images.

A wide variety of other types of image sources generating multiple image streams may be used in other embodiments, including 2D imagers configured to generate 2D infrared images, gray scale images, color images or other types of 2D images, as well as 3D imagers such as SL and ToF cameras, in any combination.

The image sources 107 may illustratively comprise respective image sensors each of which generates a separate image stream. The sensors may be separately installed and arranged apart from one another or may comprise different portions of a unified sensor having a first set of sensor cells used to generate a first image stream and a second set of sensor cells used to generate a second image stream. The first and second image streams may therefore be obtained from respective distinct image sensors configured for imaging of a given scene. Such distinct image sensors are generally assumed herein to capture substantially the same scene, but at different frame rates.

Although the first and second image streams $Fs_1$ and $Fs_2$ in the FIG. 1 embodiment are supplied by separate image sources 107-1 and 107-2, in other embodiments multiple image streams of different frame rates may be supplied using only a single imager or other type of image source. Thus, for example, the first and second image sources 107-1 and 107-2 may represent different portions of a single multi-stream imager, such as different sensors as indicated above. A given image source as that term is broadly used herein may comprise a memory or other storage device that stores previously-captured image streams for retrieval by or on behalf of the image processor 102. As another example, an image source may comprise a server that provides one or more image streams to the image processor 102 for processing.

Also, although only two input image streams are processed to increase a frame rate of one of the image streams in FIG. 1, in other embodiments more than first and second image streams may be used. For example, three or more separate image streams each with a different frame rate may be processed in order to recover additional frames so as to increase the frame rate of at least one of the image streams.

In the present embodiment, the image processor 102 is configured to recover additional frames for the second image stream $Fs_2$ based on existing frames of the first and second image streams $Fs_1$ and $Fs_2$, and to utilize the additional frames to provide an increased frame rate for the second image stream $Fs_2$. For example, the image processor 102 may increase the frame rate for the second image stream until it is substantially equal to the frame rate of the first image stream, such that the first and second image streams may be more easily processed by one or more destination devices.

More particularly, the image processor 102 is configured to determine sets of one or more additional frames for insertion between respective pairs of consecutive existing frames in the second image stream. Each such determination may be viewed as an iteration of one of the exemplary processes to be described in conjunction with the flow diagrams of FIGS. 3 and 4. For a given such iteration, a particular set of one or more additional frames is determined for insertion between a corresponding one of the pairs of consecutive existing frames in the second image stream based on a plurality of corresponding existing frames in the first image stream and the corresponding pair of consecutive existing frames in the second image stream.

Figure 2:
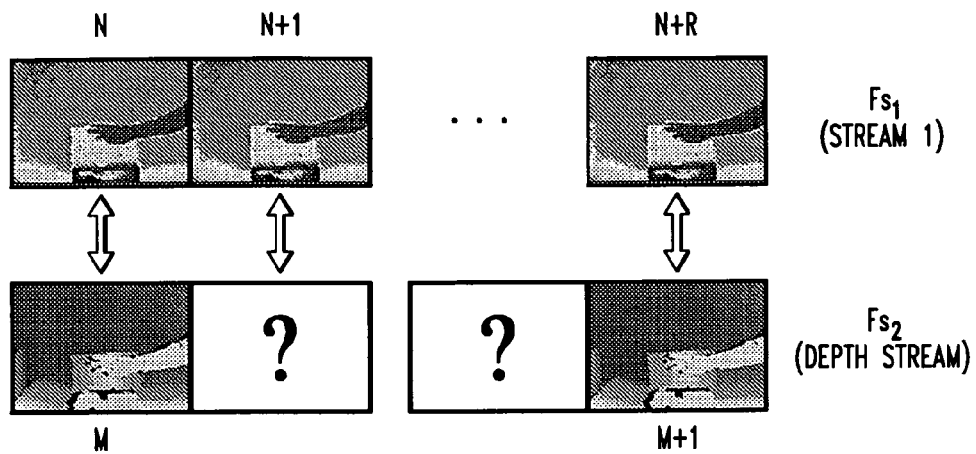
FIG. 2 illustrates insertion of recovered additional frames into a low frame rate image stream so as to increase a frame rate of that image stream in the FIG. 1 system.

This technique is illustrated in FIG. 2, which shows one example of correspondence between existing frames of the first image stream $Fs_1$ and existing frames of the second image stream $Fs_2$. The second image stream in this example is assumed to be a depth stream comprising a stream of depth images. As the first image stream has a higher frame rate than the second image stream, the first image stream over the period of time illustrated in the figure includes more frames than the second image stream. The frames of the second image stream that are marked as unknown in the figure are examples of additional frames that are recovered for the second image stream $Fs_2$ by the image processor 102 in order to provide an increased frame rate for the second image stream $Fs_2$.

Two consecutive existing frames in the second image stream $Fs_2$ correspond to R+1 consecutive existing frames in the first image stream $Fs_1$, such that an N-th existing frame in the first image stream corresponds to an M-th existing frame in the second image stream, and an (N+R)-th existing frame in the first image stream corresponds to an (M+1)-th existing frame in the second image stream. Thus, for every R+1 consecutive existing frames in the first image stream in this example, there are only two consecutive existing frames in the second image sequence.

Corresponding frames in the first and second image streams $Fs_1$ and $Fs_2$ may be frames that are captured at substantially the same time instance by respective image sensors. However, the term "corresponding" in this context is intended to be more broadly construed, so as to encompass other types of temporal relations between frames of the first and second image streams.

In recovering the additional frames for the second image stream $Fs_2$, the image processor 102 determines R+1 additional frames for insertion between the M-th existing frame and the (M+1)-th existing frame in the second image stream. As will be described in greater detail below, the R+1 additional frames determined for insertion between the M-th existing frame and the (M+1)-th existing frame in the second image stream are determined based on the corresponding R+1 consecutive existing frames in the first image stream and the M-th and (M+1)-th existing frames in the second image stream. For example, the recovery of additional frames may involve identifying correspondence between portions of one or more of the existing frames of the first image stream and portions of one or more of the existing frames of the second image stream, and forming at least one of the additional frames utilizing image information from the identified portions. In some embodiments, these portions are more particularly referred to as "clusters."

As is apparent from the above, the image processor 102 in the present embodiment is configured to generate a modified second image stream $Fs_2'$ that includes one or more additional frames within a given period of time and therefore has a higher frame rate than the original input second image stream $Fs_2$.

It should be understood that the particular arrangement shown in FIG. 2 is presented by way of illustrative example only, and other types of correspondence between frames of first and second image streams may exist in other embodiments. The disclosed techniques can be adapted in a straightforward manner to any multiple stream arrangement having a frame rate ratio $$\frac{Fr_1}{Fr_2} > 1$$

where $Fr_1$ denotes the frame rate of the first image stream $Fs_1$ and $Fr_2$ denotes the frame rate of the second image stream $Fs_2$.

The image processor 102 as illustrated in FIG. 1 includes a frame capture module 108 configured to capture frames from the input first and second image sequences $Fs_1$ and $Fs_2$ for further processing. It should be noted that "frame capture" in this context generally refers to one manner of obtaining particular frames of the first and second image sequences for further processing by the image processor. This is distinct from the original capture of the images by associated image sensors.

The captured frames are processed to recover additional frames of the second image sequence in order to provide a higher frame rate for the second image sequence. As indicated above, the higher-rate second image sequence is also referred to herein as a modified second image sequence $Fs_2'$, because it includes recovered additional frames that were not part of the original input second image sequence.

The recovery of additional frames for the second image sequence is performed using affine transform module 110, clustering module 112, cluster correspondence module 114, depth filing module 116 and postprocessing module 118 of the image processor 102. The operation of these modules will be described in greater detail in conjunction with the flow diagrams of FIGS. 3 through 7. Although these exemplary modules are shown separately in the FIG. 1 embodiment, in other embodiments two or more of these modules may be combined into a lesser number of modules.

The modified second image stream $Fs_2'$ generated by the image processor 102 may be provided to one or more of the processing devices 106 over the network 104. The processing devices 106 may comprise, for example, computers, mobile phones, servers or storage devices, in any combination. One or more such devices also may include, for example, display screens or other user interfaces that are utilized to present images generated by the image processor 102. The processing devices 106 may therefore comprise a wide variety of different destination devices that receive processed image streams from the image processor 102 over the network 104, including by way of example at least one server or storage device that receives one or more processed image streams from the image processor 102.

Although shown as being separate from the processing devices 106 in the present embodiment, the image processor 102 may be at least partially combined with one or more of the processing devices. Thus, for example, the image processor 102 may be implemented at least in part using a given one of the processing devices 106. By way of example, a computer or mobile phone may be configured to incorporate the image processor 102 and possibly one or more of the image sources 107. The image sources 107 may therefore comprise cameras or other imagers associated with a computer, mobile phone or other processing device. It is therefore apparent that the image processor 102 may be at least partially combined with one or more image sources or image destinations on a common processing device.

The image processor 102 in the present embodiment is assumed to be implemented using at least one processing device and comprises a processor 120 coupled to a memory 122. The processor 120 executes software code stored in the memory 122 in order to control the performance of image processing operations. The image processor 102 also comprises a network interface 124 that supports communication over network 104.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The memory 122 stores software code for execution by the processor 120 in implementing portions of the functionality of image processor 102, such as portions of modules 110, 112, 114, 116 and 118. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. As indicated above, the processor may comprise portions or combinations of a microprocessor, ASIC, FPGA, CPU, ALU, DSP or other image processing circuitry.

It should also be appreciated that embodiments of the invention may be implemented in the form of integrated circuits. In a given such integrated circuit implementation, identical die are typically formed in a repeated pattern on a surface of a semiconductor wafer. Each die includes image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

For example, in some embodiments, the image processing system 100 is implemented as a video gaming system or other type of gesture-based system that processes image streams in order to recognize user gestures. The disclosed techniques can be similarly adapted for use in a wide variety of other systems requiring a gesture-based human-machine interface, and can also be applied to applications other than gesture recognition, such as machine vision systems in robotics and other industrial applications.

Figure 3:
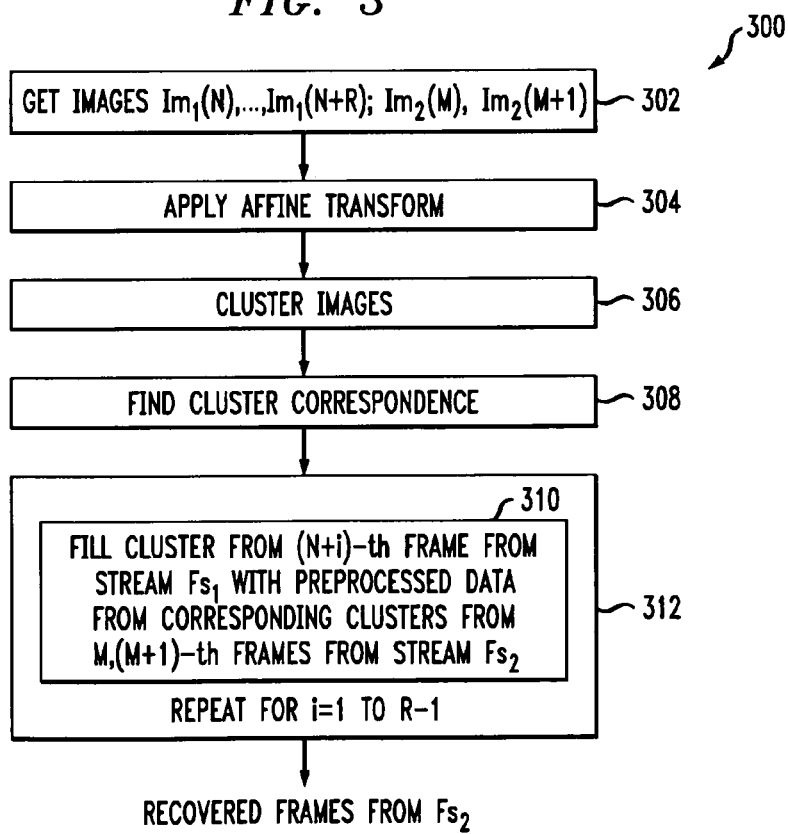
FIG. 3 is a flow diagram of an exemplary process for increasing a frame rate of a low frame rate image stream in the FIG. 1 system.

Referring now to FIG. 3, an exemplary process 300 for increasing the frame rate of the second image stream $Fs_2$ is shown. The process is assumed to be implemented by the image processor 102 using at least its modules 108, 110, 112, 114, 116 and 118. The process in this embodiment includes steps 302 through 312, which are repeated for each of multiple iterations. At each iteration, the process obtains R+3 frames, including R+1 frames from the first image stream $Fs_1$ and two frames from the second image stream $Fs_2$, and recovers R−1 additional frames for insertion between the two frames of the second image stream $Fs_2$ in order to increase the frame rate of that image stream. The additional frames recovered by the process are also referred to herein as "connecting" frames of the second image stream. In addition, the frames in this embodiment are referred to as respective images. The term "frame" as used herein is intended to be broadly construed, so as to encompass an image or other types and arrangements of image information.

In step 302, the image processor 102 in a given iteration of the FIG. 3 process "gets" or otherwise obtains particular designated images from the $Fs_1$ and $Fs_2$ image streams. These images include R+1 images denoted $Im_1(N)$ through $Im_1(N+R)$ from the first image stream $Fs_1$ and two images denoted $Im_2(M)$ and $Im_2(M+1)$ from the second image stream $Fs_2$. It is assumed for clarity and simplicity of description that that all of the images $Im_i(j)$ have the same size or resolution in pixels, although images of different sizes or resolutions may be used in other embodiments.

The R+3 images referred to in the context of step 302 are more generally referred to herein as the above-noted R+1 frames from the first image stream $Fs_1$ and the two frames from the second image stream $Fs_2$. The images may be obtained from their respective image streams using the frame capture module 108.

In step 304, an affine transform is applied to at least a subset of the R+3 images obtained in step 302. For example, the affine transform may be applied only to the R+1 images from the first image stream $Fs_1$, or only to the two images from the second image stream $Fs_2$. The affine transform is an example of a type of calibrating transform used to substantially equalize the viewpoints of the images in order to facilitate subsequent clustering operations. The affine transform may be based on results of image sensor calibration performed at sensor manufacturing or setup, and is applied using the affine transform module 110 of the image processor 102. In embodiments in which the viewpoints of the images from the first and second image streams are already substantially equalized, for example, due to placement or arrangement of the image sensors for the first and second image streams, the affine transform operation may be eliminated.

In step 306, the R+3 images are segmented into clusters by application of a clustering operation to these images. This operation is implemented using the clustering module 112 of image processor 102. The clustering operation more particularly involves generating a separate cluster map for each of the R+3 images. More particularly, a separate cluster map is generated for each image in the set of input images $\{Im_1(N), Im_1(N+1), Im_1(N+R); Im_2(M), Im_2(M+1)\}$. The cluster maps for different images may have different characteristics, such as different numbers of clusters and different cluster numeration orders.

By way of example, a given cluster map $Cm_i(j)$ for image $Im_i(j)$ may be defined in the following manner. Assume that the set of all pixels from image $Im_i(j)$ is segmented into non-intersecting subsets of pixels with each such subset representing a cluster. The cluster map in this case may be in the form of a matrix $Cm_i(j)$ having the same size as image $Im_i(j)$. Element (m,n) from $Cm_i(j)$ corresponds to the index of a particular cluster of $Im_i(j)$ to which the image pixel having coordinates (m,n) belongs. Other types of cluster maps may be used in other embodiments. The term "cluster map" as used herein is therefore intended to be broadly construed. For example, at least a portion of the cluster correspondence information generated by cluster correspondence module 114 may also be generated in the form of one or more cluster maps.

A variety of different clustering techniques may be used in implementing step 306. A detailed example of such a clustering technique based on statistical region merging (SRM) will be described elsewhere herein. Conventional aspects of SRM are disclosed in R. Nock and F. Nielsen, "Statistical region merging," IEEE Transactions on Pattern Analysis and Machine Intelligence, Vol. 26, No. 11, November 2004, which is incorporated by reference herein. The clustering techniques in this embodiment generally attempt to ensure that the boundaries of the identified clusters include significant boundaries of corresponding objects in the imaged scene even if those objects may be located different distances from the image sensors for the respective first and second image streams, or may appear in different colors or with other differing characteristics in the two image streams.

In step 308, cluster correspondence information is determined based on the cluster maps generated for the respective images in step 306. This determination is performed by the cluster correspondence module 114 of image processor 102. The cluster correspondence information is indicative of correspondence between clusters of the cluster maps generated in step 306, and as noted above may itself be expressed at least in part using other types of cluster maps, such as cluster maps denoted as $Cg_1$ and $Cg_2$ elsewhere herein.

As one illustration, the cluster correspondence operation in step 308 may receive as its inputs the cluster maps $Cm_1(N), \ldots, Cm_1(N+R); Cm_2(M), Cm_2(M+1)$ from step 306 and the set of input images $\{Im_1(N), Im_1(N+1), \ldots, Im_1(N+R); Im_2(M), Im_2(M+1)\}$. Determining cluster correspondence in this case involves finding relationships between sets of clusters in different images, so that, for example, non-intersecting sets of clusters of one input image $Im_1(j)$ from the first image stream correspond to non-intersecting sets of clusters of another input image $Im_2(k)$ from the second image stream.

Thus, the cluster correspondence may identify a set of multiple clusters in $Im_1(j)$ as corresponding to a different set of multiple clusters in $Im_2(k)$, with both clusters being associated with the same imaged object or objects. The sets of clusters of $Im_1(j)$ and $Im_2(k)$ are assumed to cover substantially the entire set of image pixels of those respective images. Also, images $Im_1(j)$ and $Im_2(k)$ are assumed to be captured at substantially the same time by respective image sensors, such as frames N and M or frames N+R and M+1 in the FIG. 2 example. Additional details of exemplary cluster correspondence determinations will be described below in conjunction with FIGS. 5 through 7.

In step 310, a depth filling operation is applied using the cluster correspondence information obtained in step 308. This generally involves merging depth data from corresponding clusters in the images of the first and second image streams into one or more of the additional frames. More particularly, as indicated in the figure, in recovering frame N+i, at least one cluster from frame N+i of the first image stream $Fs_1$ is filled with depth data from corresponding clusters from frames M and M+1 of the second image stream $Fs_2$. The depth data filled into the recovered frames in the depth filling operation may be preprocessed in a manner to be described elsewhere herein. In other embodiments, image information other than or in addition to depth data may be used in recovering the additional frames based on cluster correspondence information.

As indicated at step 312, the depth filling operation of step 310 is repeated for i=1 to R−1 in order to recover the full set of R−1 additional frames for use in increasing the frame rate of the second image stream $Fs_2$. These depth filling operations are performed by the depth filling module 116 of the image processor 102.

Although not explicitly illustrated in the FIG. 3 embodiment, postprocessing operations may be applied after the depth filling operation of steps 310 and 312 in order to enhance the quality of the recovered additional frames. Such postprocessing operations are implemented using the postprocessing module 118 of the image processor 102. In other embodiments, the postprocessing may be eliminated, or at least partially combined with the depth filling operations. Also, other sets of additional or alternative operations may be used in implementing the process 300, and the particular operations shown in the figure should therefore be viewed as exemplary only.

Figure 4:
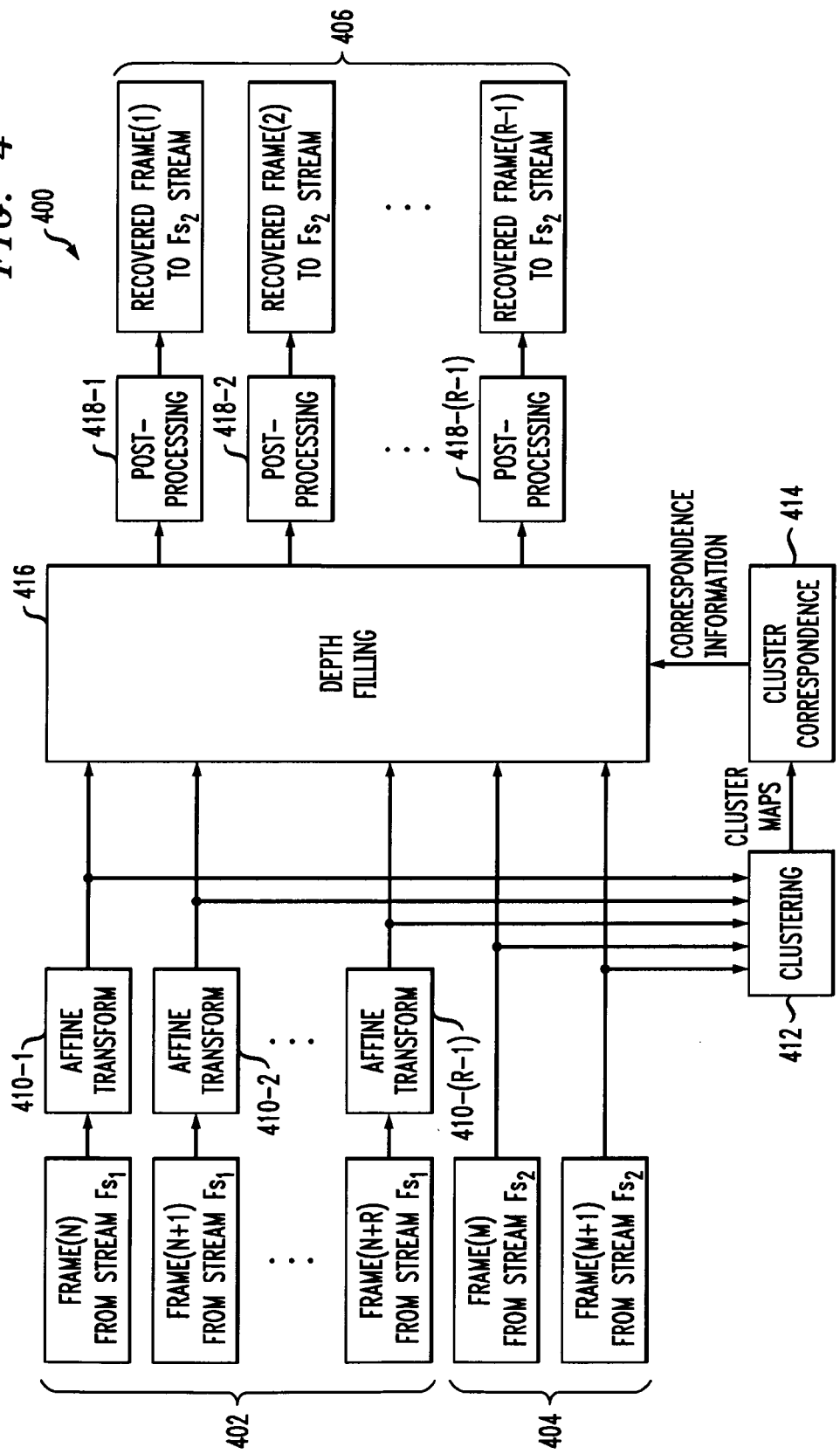
FIG. 4 is a flow diagram showing another exemplary process for increasing a frame rate of a low frame rate image stream in the FIG. 1 system.

Another exemplary process 400 for increasing the frame rate of the low frame rate image stream $Fs_2$ is shown in FIG. 4. This process as shown takes as its inputs R+1 frames 402 from the first image stream $Fs_1$ and two frames 404 from the second image stream $Fs_2$, and generates as its outputs R−1 recovered additional frames 406 of the second image stream $Fs_2$. In the figure, the R+1 frames 402 from the first image stream are denoted as frames N through N+R, the two frames 404 from the second image stream are denoted as frames M and M+1, and the R−1 output frames 406 are denoted as recovered frames 1 through R−1. Again, other numbers and types of input and output frames may be used in other embodiments.

The process 400 includes processing operations for affine transform 410, clustering 412, cluster correspondence 414, depth filling 416 and postprocessing 418, illustrated in the figure as respective blocks which are assumed to be implemented by the respective modules 110, 112, 114, 116 and 118 of image processor 102. As mentioned previously, these processing operations are exemplary only, and other embodiments may use additional or alternative sets of operations to increase the frame rate of an image stream.

The affine transform in the present embodiment is applied only to the R+1 frames 402 from the first image stream $Fs_1$. This is illustrated in the figure by affine transform blocks 410-1, 410-2, . . . 410-(R−1) which process respective input frames N, N+1, . . . N+R from the set of input frames 402. The input frames 404 which comprise the two frames M and M+1 of the second image stream $Fs_2$ are applied directly to clustering block 412 and depth filling block 416. The affine transformed frames at the output of the affine transform blocks 410-1, 410-2, . . . 410-(R−1) are also applied to clustering block 412 and depth filling block 416, as indicated in the figure. The clustering block 412 generates cluster maps in the manner previously described, and the cluster correspondence block 414 determines correspondence between clusters in frames from the first and second input streams. The resulting cluster correspondence information, which as noted above may include additional cluster maps, is provided to the depth filling block 416 which utilizes that information to recover the R−1 additional frames of the second image streams. Postprocessing is separately applied to each of these additional frames as indicated by postprocessing blocks 418-1, 418-2, . . . 418-(R−1). These postprocessing blocks 418 provide at their respective outputs the R−1 output frames 406.

As in the FIG. 3 embodiment, the processing operations of the FIG. 4 embodiment are repeated for each of a plurality of iterations, with each such iteration determining a set of additional frames for insertion between a given pair of consecutive existing frames of the second image stream $Fs_2$ in order to increase the frame rate of that image stream.

Exemplary affine transform operations performed by affine transform module 110 of image processor 102 will now be described in greater detail.

Let $Im_i(N)$ be a captured image in the N-th frame of image stream $Fs_i$ where $i=1,2$. An affine transform T may be determined such that $T(Im_1(N))$ is placed into the coordinate system of $Im_2(N)$.

In an embodiment in which image sensors are fixed relative to one another and their collocation is known in advance, affine transform T may be defined at sensor manufacturing or setup as $T_1=T(T_2)$, where $T_1$ is a vector basis of the i-th image sensor in 3D space and the affine transform T is an amplication matrix, where an amplication matrix generally provides a linear transformation that maps one set of vectors to another set of vectors. Accordingly, a given amplication matrix can be used, for example, to transform a vector basis of a first image sensor to a vector basis of a second image sensor, where the vector bases are considered in a single 3D space.

Key points associated with the affine transform T are expected to be in either 2D or 3D space depending on the type of image sensors used, and may be selected manually or by an automatic technique (e.g., using edge analysis). A suitable number of key points for many practical applications will be on the order of approximately 20, although other numbers of key points can be used in other embodiments.

The affine transform may be determined by solving an overdetermined system of linear equations using the least squares method, as will now be described. Let m denote the number of key points, define $D_{xyz}$ as a 2×m or 3×m matrix containing coordinates for every m points from $Im_1(N)$ written column-by-column, and define $T_{xyz}$ as a 2×m or 3×m matrix containing corresponding m points from $Im_2(N)$ written column-by-column. Let A and TR denote an affine transform matrix and an associated translation vector, respectively, that are optimal in a least mean squares sense. For the 3D case:

$$\left\{ A \cdot \begin{pmatrix} x_1^1 y_1^1 z_1^1 \\ \ldots \\ x_m^1 y_m^1 z_m^1 \end{pmatrix}^T + \overline{TR} = \begin{pmatrix} x_1^2 y_1^2 z_1^2 \\ \ldots \\ x_m^2 y_m^2 z_m^2 \end{pmatrix}^T \right\},$$

$$D_{xyz} = \begin{pmatrix} x_1^1 y_1^1 z_1^1 \\ \ldots \\ x_m^1 y_m^1 z_m^1 \end{pmatrix}^T, T_{xyz} = \begin{pmatrix} x_1^2 y_1^2 z_1^2 \\ \ldots \\ x_m^2 y_m^2 z_m^2 \end{pmatrix}^T$$

where $(x_i^j, y_i^j, z_i^j)$ are coordinates of the i-th key point of $Im_j(N)$ and matrix A and vector TR collectively define the affine transform:

$$T_{xyz} = A \cdot D_{xyz} + TR,$$

Matrix A and vector TR can be found as a solution of the following optimization problem:

$$\|A \cdot D_{xyz} + TR - T_{xyz}\|^2 \to \min.$$

Using element-wise notation $A=(a_{ij})$, where $(i,j)=(1,1)\ldots(3,3)$, and $TR=(tr_k)$, where $k=1\ldots 3$, the solution of this optimization problem in the least mean squares sense is based on the following system of linear equations, which comprises a total of 12 variables and 12m equations:

$$dR/da_{ij}=0, i=1,2,3, j=1,2,3,$$

$$dR/dtr_k=0, k=1,2,3.$$

After affine transform parameters A and TR are determined in the manner described above, image $Im_1(N)$ is transformed into the coordinate system of $Im_2(N)$ as follows:

$$D_{1xyz} = A \cdot D_{xyz} + TR.$$

As a result of application of the affine transform, (x,y) coordinates of pixels in the resulting transformed image $D_1$ are not always integers, but are instead more generally rational numbers. These rational number coordinates can be mapped to a regular equidistant orthogonal integer lattice of $Im_2(N)$ using techniques such as nearest neighbor or interpolation. Such a mapping provides an image $Im_1(N)$ having the same resolution as $Im_2(N)$, although with possibly vacant pixel positions (i.e., undefined data) as the mapping may leave some points in the regular lattice unfilled.

The foregoing is just one example of an affine transform that may be implemented by image processor 102, and other embodiments can use other types of transforms or techniques to align the coordinate systems of the image sensors used to generate the first and second image streams.

Exemplary clustering operations performed by clustering module 112 of image processor 102 will now be described in greater detail. It should initially be noted that the clustering module may implement several different clustering techniques that require different levels of computational resources and switch between those techniques based on the current computational load of the image processor 102.

As mentioned previously, clustering techniques suitable for use in the clustering module 112 may be based on statistical region merging or SRM. Such techniques are generally resistant to random noise and have moderate computational complexity as well as good quantitative error bounds. Also, the degree of segmentation can be regulated in a manner that allows computational requirements to be dynamically controlled.

In a more particular example of an SRM-based clustering technique, each pixel of an actual image $Im_i(j)$ is represented by a family of independently distributed random variables relating to an optimal image $Id_i(j)$, with the actual image $Im_i(j)$ being considered a particular observation of the optimal image $Id_i(j)$. The actual and optimal images $Id_i(j)$ and $Im_i(j)$ are each separated into optimal statistical regions using a homogeneity rule specifying that inside each statistical region pixels have the same expectation, and expectations of adjacent regions are different.

This exemplary SRM-based technique implements recursive merging using a specified merging predicate P. Consider an arbitrary image $Im_i(j)$. Let each pixel of $Im_i(j)$ be represented by Q random variables. Then merging predicate P for two arbitrary regions $R_1, R_2$ of $Im_i(j)$ can be expressed as follows:

$$P(R_1, R_2) = \begin{cases} \text{true}, & \text{if } |R_1 - R_2| \leq \sqrt{b^2(R_1) + b^2(R_2)} \\ \text{false}, & \text{otherwise} \end{cases},$$

where $$b(R) = G \sqrt{\frac{1}{2Q|R|} \cdot \ln(|R|^{|R|}/\delta)}$$

where |R| denotes the number of pixels in region R, G denotes the maximum possible value of a given pixel of the current image (e.g., $G=2^{12}$ for an image from a Kinect image sensor), and δ is a positive value less than 1. Accordingly, $|R_1-R_2|$ denotes the magnitude of the difference between the number of pixels in region $R_1$ and the number of pixels in region $R_2$. This technique merges regions $R_1$ and $R_2$ into a single cluster if $P(R_1,R_2)$=true.

The technique starts at the pixel level, with every pixel initially being considered an individual region. The order in which the merging of regions is tested against the predicate P follows an invariant A which indicates that when any test between two parts of two different regions occurs, that means all tests inside these two regions have previously occurred. This invariant A can be achieved using a function $f(pix_1, pix_2)=|pix_1-pix_2|$, where $pix_i$ is an image pixel value.

The SRM-based technique then proceeds in the following manner. First, all possible pairs of pixels $(pix_1,pix_2)$ are sorted in increasing order of function $f(pix_1,pix_2)=|pix_1-pix_2|$, and the resulting order is traversed only once. For any current pair of pixels $(pix_1,pix_2)$ for which $R(pix_1) \ne R(pix_2)$, where $R(pix)$ denotes the current region to which pix belongs, the test $P(R(pix_1),R(pix_2))$ is performed and $R(pix_1)$ and $R(pix_2)$ are merged if and only if the test returns true. At the completion of the merging process for the current image, the image pixels have been separated into multiple clusters with the clusters being characterized by a cluster map of the type of described previously.

The function $f(pix_1,pix_2)=|pix_1-pix_2|$ is used in this embodiment as an approximation of the invariant A, although other functions can be used. Also, merging predicates and other parameters can be varied in the above-described SRM-based technique. Moreover, various clustering techniques not based on SRM may be used.

Figure 5:
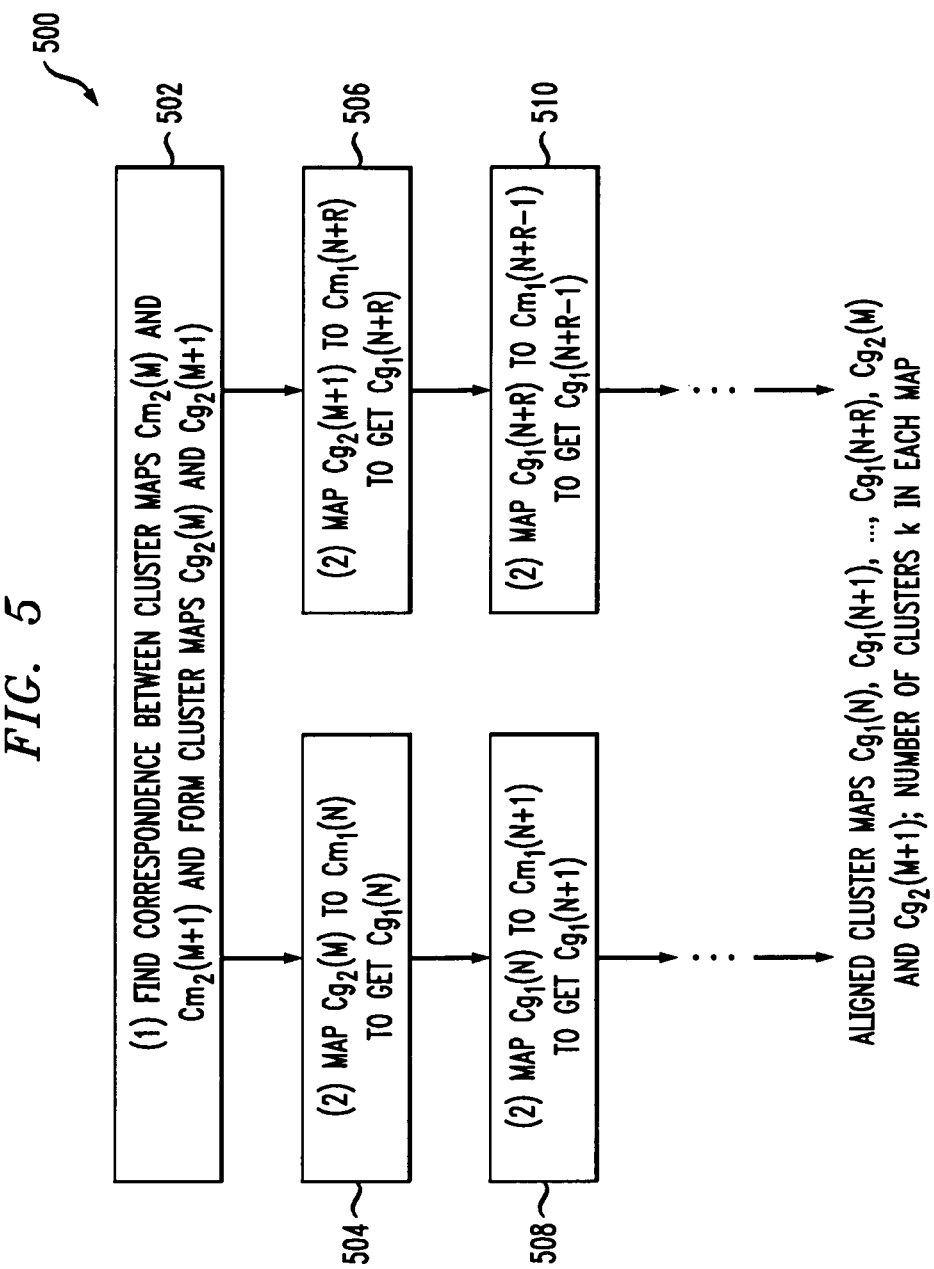
FIGS. 5 through 7 are flow diagrams illustrating the operation of a cluster correspondence module of an image processor in the FIG. 1 system.
Figure 6:
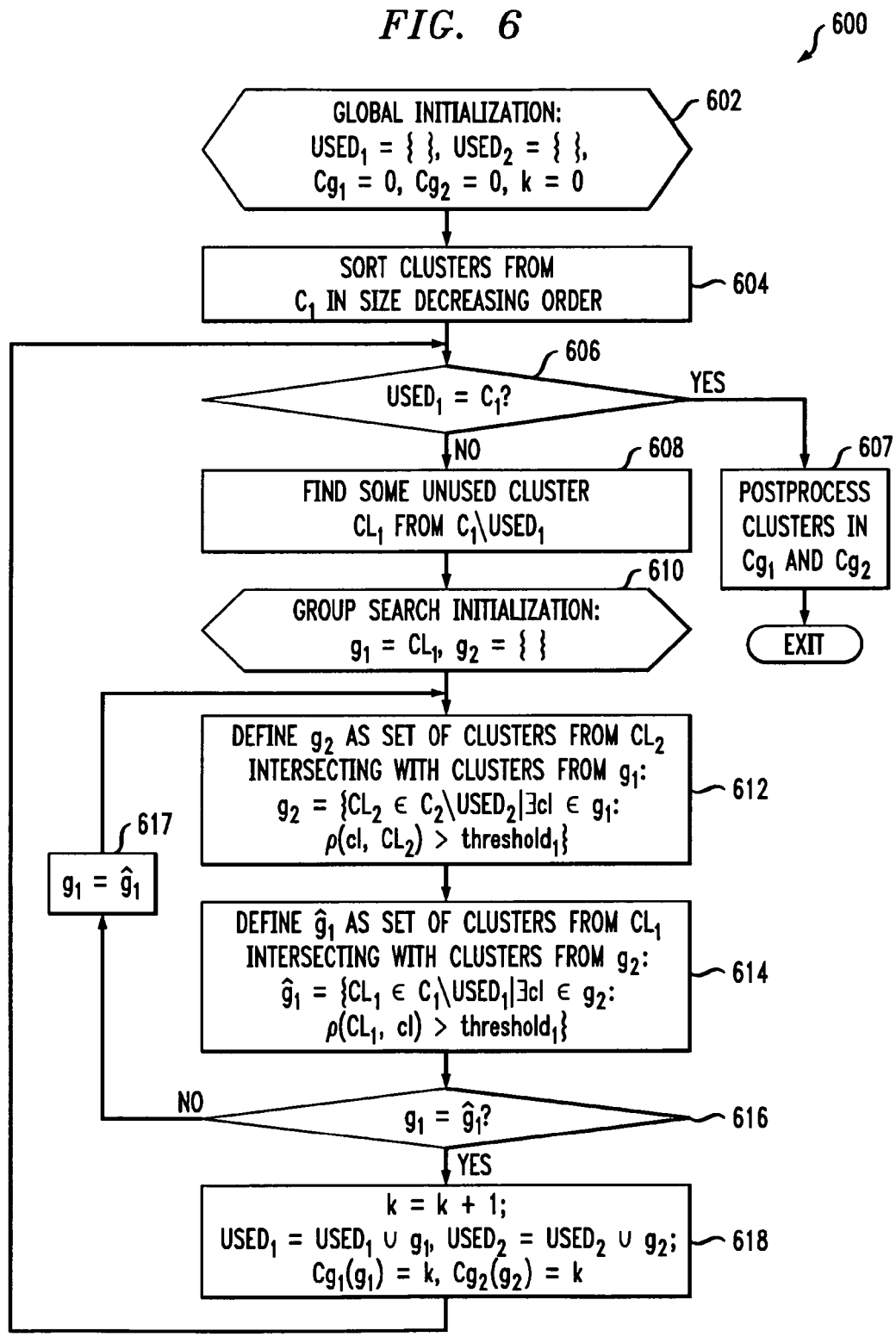
Figure 7:
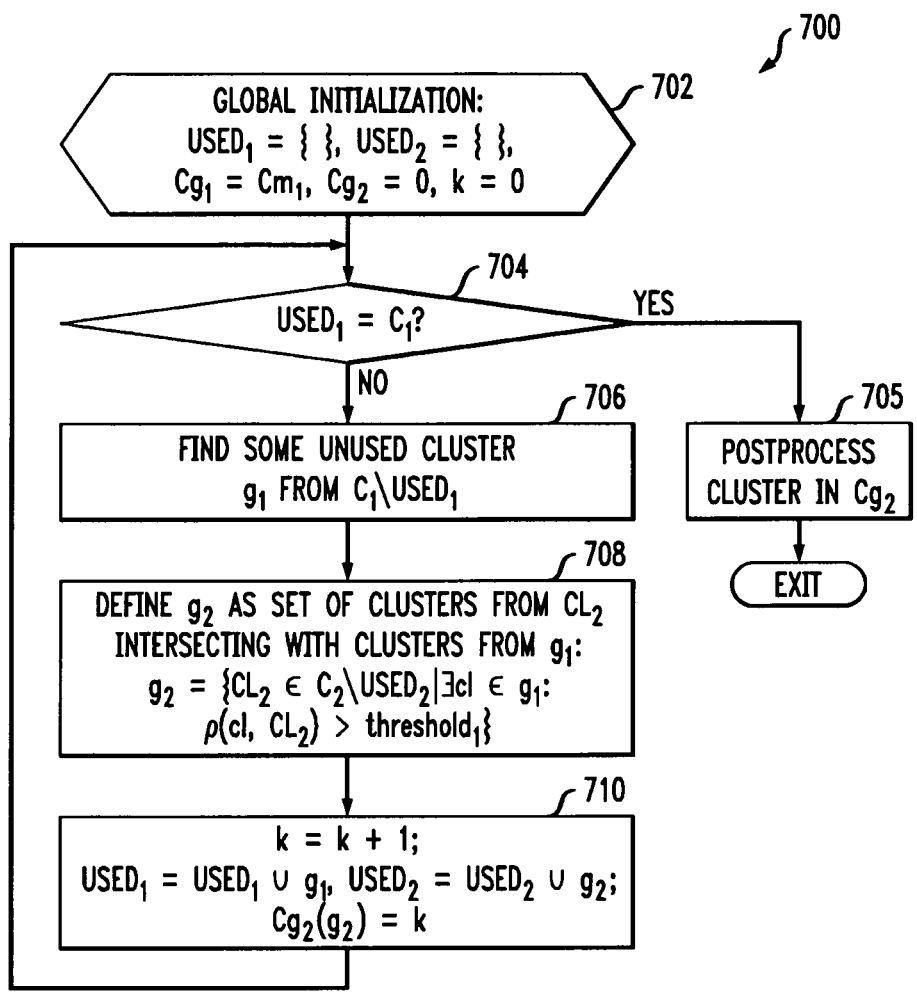

Exemplary cluster correspondence operations performed by cluster correspondence module 114 of image processor 102 will now be described in greater detail with reference to FIGS. 5 through 7. FIG. 5 illustrates an overall cluster correspondence process 500 which includes portions denoted as (1) and (2) that are illustrated in respective processes 600 and 700 of FIGS. 6 and 7. There is a single instance of portion (1) in step 502, and multiple separate instances of portion (2) in respective steps 504, 506, 508 and 510. Portion (1) generally involves determining correspondence between two cluster maps, and a given instance of portion (2) generally involves mapping of one set of clusters to another set of clusters. It is to be appreciated, however, that additional or alternative cluster correspondence operations may be used in other embodiments.

Referring initially to FIG. 5, the cluster correspondence process 500 includes steps 502 associated with portion (1) and steps 504, 506, 508 and 510 each associated with an instance of portion (2).

In step 502, correspondence is determined between cluster maps $Cm_2(M)$ and $Cm_2(M+1)$ and cluster maps $Cg_2(M)$ and $Cg_2(M+1)$ are formed.

In step 504, cluster map $Cg_2(M)$ is mapped to cluster map $Cm_1(N)$ to get cluster map $Cg_1(N)$.

In step 506, cluster map $Cg_2(M+1)$ is mapped to cluster map $Cm_1(N+R)$ to get cluster map $Cg_1(N+R)$.

In step 508, cluster map $Cg_1(N)$ is mapped to cluster map $Cm_1(N+1)$ to get cluster map $Cg_1(N+1)$.

In step 510, cluster map $Cg_1(N+R)$ is mapped to cluster map $Cm_1(N+R-1)$ to get cluster map $Cg_1(N+R-1)$.

The sequence of mapping operations illustrated by steps 504 and 508 continues for one or more remaining frames.

Similarly, the sequence of mapping operations illustrated by steps 506 and 510 continues for one or more remaining frames.

As indicated, process 500 upon completion of the above-noted sequences of mapping operations produces cluster maps $Cg_1(N), Cg_1(N+1), \ldots, Cg_1(N+R), Cg_2(M)$ and $Cg_2(M+1)$ as well as the number of clusters k in each of these cluster maps.

The cluster maps Cg1 and Cg2 are also referred to as aligned cluster maps, and may be viewed as examples of what is more generally referred to herein as "cluster correspondence information." Like other cluster maps disclosed herein, Cg1 and Cg2 cluster maps may be represented as respective matrices. Numerous other types of cluster correspondence information may be used in other embodiments of the invention.

The exemplary process 600 for performing portion (1) in step 502 of FIG. 5 will now be described with reference to FIG. 6. As noted above, portion (1) generally involves determining correspondence between two cluster maps. Process 600 for implementing this functionality includes steps 602 through 618.

Let $C_1$ and $C_2$ denote two cluster maps that are to be mapped to one another using the process 600 to be described. In the context of step 502 of FIG. 5, $C_1=Cm_2(M)$ and $C_2=Cm_2(M+1)$. Let $N_1$ denote the number of clusters in $C_1$ and let $N_2$ denote the number of clusters in $C_2$.

Consider an arbitrary cluster $CL_1$ from $C_1$ and an arbitrary cluster $CL_2$ from $C_2$. The cluster $CL_2$ is said to intersect with the cluster $CL_1$ if the following condition is met:

$$\rho(CL_1, CL_2) > \text{threshold}_1.$$

Here $0 \le \rho(CL_1,CL_2) \le 1$ denotes a relative intersection measure of two sets of pixels. For example, a given one of the following symmetric and non-symmetric intersection measures may be used:

$$\rho_1(CL_1, CL_2) = \frac{|CL_1 \cap CL_2|}{|CL_1 \cup CL_2|}$$

and $$\rho_2(CL_1, CL_2) = \frac{|CL_1 \cap CL_2|}{|CL_2|}$$

The threshold value $\text{threshold}_1$ corresponds to a predefined threshold value (e.g., 0.1) which may be controlled as a parameter of the process.

Cluster mapping in the process 600 starts from empty cluster maps $Cg_1$ and $Cg_2$, which may be represented in the form of zero matrices. Three additional variables are initialized, including the number of clusters k, and variables $Used_1$ and $Used_2$ that denote sets of already used clusters from $C_1$ and $C_2$ respectively.

In step 602, a global initialization of the process sets $Used_1=\{\}$, $Used_2=\{\}$, $Cg_1=0$, $Cg_2=0$, and $k=0$.

In step 604, clusters from $C_1$ are sorted in order of decreasing size based on the number of pixels in each cluster.

In step 606, a determination is made as to whether or not all clusters from $C_1$ have been used for grouping into sets. If all the clusters from $C_1$ have been used, the process 600 postprocesses the clusters in $Cg_1$ and $Cg_2$ as indicated in step 607, and the process is then exited as indicated. If all the clusters from $C_1$ have not been used, the process 600 moves to step 608.

In step 608, an unused cluster $CL_1$ from $C_1$ is found.

In step 610, a set search initialization is performed by initializing set $g_1$ as $\{CL_1\}$ and corresponding set $g_2$ as an empty set. The process then loops through steps 612, 614, 616 and 617.

In step 612, $g_2$ is defined as a set of clusters from $CL_2$ that intersect with clusters from $g_1$, as follows:

$$g_2 = \{CL_2 \in C_2 \setminus \text{Used}_2 | \exists cl \in g_1 : \rho(cl, CL_2) > \text{threshold}_1\}.$$

In step 614, $\hat{g}_1$ is defined as a set of clusters from $CL_1$ that intersect with clusters from the new $g_2$ defined in step 612, as follows:

$$\hat{g}_1 = \{CL_1 \in C_1 \setminus \text{Used}_1 | \exists cl \in g_2 : \rho(CL_1, cl) > \text{threshold}_1\}.$$

In step 616, a determination is made as to whether or not $g_1$ is equal to $\hat{g}_1$. If $g_1$ is not equal to $\hat{g}_1$, the process moves to step 617, and otherwise moves to step 618.

In step 617, $g_1$ is set equal to $\hat{g}_1$, and steps 612, 614 and 616 are repeated until the condition $g_1 = \hat{g}_1$ is met, at which point the process moves to step 618. This condition will be met after a finite number of iterations of the loop comprising steps 612, 614, 616 and 617, as there are finite numbers of clusters in $C_1$ and $C_2$.

In step 618, k is increased by 1 and sets of used clusters are updated, such that k=k+1, $\text{Used}_1 = \text{Used}_1 \cup g_1$, and $\text{Used}_2 = \text{Used}_2 \cup g_2$. Also, $g_1$ and $g_2$ are added to the resulting cluster maps $Cg_1$ and $Cg_2$ by setting $Cg_1(g_1)$ and $Cg_2(g_2)$ both equal to k, where $Cg_1(g_1)=k$ means that all elements of the matrix for cluster map $Cg_1$ corresponding to pixels from cluster $g_1$ are set to k and similarly $Cg_2(g_2)=k$ means that all elements of the matrix for cluster map $Cg_2$ corresponding to pixels from cluster $g_2$ are set to k.

The process then returns to step 606 as indicated. As noted above, if it is determined in step 606 that all the clusters from $C_1$ have been used, the process 600 postprocesses the clusters in $Cg_1$ and $Cg_2$ as indicated in step 607. By way of example, such postprocessing, which is distinct from the postprocessing performed by postprocessing blocks 418 in FIG. 4, may involve identifying any clusters in $Cg_1$ that have corresponding empty clusters in $Cg_2$ and any clusters in $Cg_2$ that were not assigned to any of the clusters in $Cg_1$. In both of these cases, each of the identified clusters is combined into the neighboring cluster with which it shares the longest boundary, where the boundary length between two clusters is defined as the number of boundary pixels for these clusters, and where a given boundary pixel is a pixel that has one or more neighbors from both clusters.

The postprocessing in step 607 may involve additional operations using a depth distance measure between clusters. For example, such a depth distance measure may be defined as absolute difference between average depths for two clusters, or as absolute distance between mean depth of boundary pixels of two clusters. The additional operations may include merging neighboring clusters in $Cg_1$ if the corresponding depth distance measure between them is less than a predefined threshold threshold2. Portion (2) of the FIG. 5 process can be applied to determine the corresponding merging procedure for $Cg_2$.

Alternative techniques can be used in place of process 600. For example, it is possible to apply an exhaustive search of all cluster sets in both images M and M+1 of the second image stream.

The exemplary process 700 for performing a given instance of portion (2) in a particular one of steps 504, 506, 508 and 510 of FIG. 5 will now be described with reference to FIG. 7. As noted above, a given instance of portion (2) generally involves mapping of one set of clusters to another set of clusters, and may be viewed as a simplified version of process 600. In this simplified version, for example, clusters from Cg are kept unchanged, and only clusters from Cm are grouped into sets. Such an arrangement is particularly useful when the number of clusters in Cm is greater than the number of clusters in Cg. Process 700 for implementing this functionality includes steps 702 through 710.

In step 702, a global initialization of the process sets $\text{Used}_1 = \{\}$, $\text{Used}_2 = \{\}$, $Cg_1 = Cm_1$, $Cg_2 = 0$, and k=0.

In step 704, a determination is made as to whether or not all clusters from $C_1$ have been used for grouping into sets. If all the clusters from $C_1$ have been used, the process 700 postprocesses the clusters in $Cg_2$ as indicated in step 705, and the process is then exited as indicated. If all the clusters from $C_1$ have not been used, the process 700 moves to step 706.

In step 706, an unused cluster $g_1$ from $C_1$ is found.

In step 708, $g_2$ is defined as a set of clusters from $CL_2$ that intersect with clusters from $g_1$, as follows:

$$g_2 = \{CL_2 \in C_2 \setminus \text{Used}_2 | \exists cl \in g_1 : \rho(cl, CL_2) > \text{threshold}_1\}.$$

In step 710, k is increased by 1 and sets of used clusters are updated, such that k=k+1, $\text{Used}_1 = \text{Used}_1 \cup g_1$, and $\text{Used}_2 = \text{Used}_2 \cup g_2$. Also, $g_2$ is added to resulting cluster map $Cg_2$ by setting $Cg_2(g_2)$ equal to k, where $Cg_2(g_2)=k$ means that all elements of the matrix for cluster map $Cg_2$ corresponding to pixels from cluster $g_2$ are set to k.

The process then returns to step 704 as indicated. As noted above, if it is determined in step 704 that all the clusters from $C_1$ have been used, the process 700 postprocesses the clusters in $Cg_2$ as indicated in step 705.

It is to be appreciated that the particular process steps used in the flow diagrams of FIGS. 3 through 7 are exemplary only, and other embodiments can utilize different types and arrangements of image processing operations. For example, the particular types of clustering operations can be varied in other embodiments. Also, steps indicated as being performed serially in a given flow diagram can be performed at least in part in parallel with one or more other steps in other embodiments.

Exemplary depth filling operations performed by depth filling module 116 of image processor 102 will now be described in greater detail.

After the cluster correspondence module 114 determines cluster correspondence information in the manner described above, that information is passed to the depth filling module 116 which recovers the additional frames for insertion between existing frames M and M+1 of the second images stream $Fs_2$. The depth filling module adds depth data from these existing frames to particular clusters in the additional frames.

By way of example, using the cluster correspondence information, the depth filling module can process $Cm_1(N+i)$, i=1,2,..., R−1 to determine sets of clusters $\{CL_1, ..., CL_P\}$ and $\{CL_1', ..., CL_T'\}$, where P is less than the maximum number of different elements in $Cm_2(M)$ from $Im_2(M)$ and T is less than the maximum number of different elements in $Cm_2(M+1)$ from $Im_2(M+1)$.

As indicated previously, depth data may be preprocessed before being filled into the additional frames by the depth filling module 116. For example, depth data may be enlarged in the following manner:

$$dData(i, j) = \max\left(\max_{cluster \in CSET}\left[\max_{pix(i,j) \in cluster}(pix(i, j))\right],\right.$$
$$\left.\max_{cluster \in CSET'}\left[\max_{pix(i,j) \in cluster}(pix(i, j))\right]\right)$$

where dData(i,j) denotes the depth data with coordinates (i,j) and pix(i,j) is a value of the image pixel with coordinates (i,j). Additionally or alternatively, the depth data may be smoothed as follows:

$$dData = smooth(dData, smooth\_str)$$

where this smoothing technique replaces depth data dData(i,j) for a given pixel by a weighted sum of depth data for neighboring pixels. The neighborhood template size is given by smooth_str (e.g., smooth_str=5). It should be understood that these particular preprocessing operations are exemplary only, and other types of preprocessing prior to depth filling may be used in other embodiments.

After constructing depth data dData for a given cluster from $Im_1(N+i)$, i=1,2, ... R−1, the depth filling module 116 uses that depth data to fill a corresponding cluster in a given recovered image. As the given cluster in the example is extracted from an image of the high frame rate image stream $Fs_1$, it can provide much more accurate positioning and edges of an associated imaged object than the images of the low frame rate image stream $Fs_2$.

The recovered image may be expressed as a sum of indicators Ind over all clusters from cluster maps related to $Im_1(N+i)$ as follows:

$$iData(p, q) = \sum_{CL \in Cm_1(N+i)} Ind(pix(p, q) \in CL) \cdot dData(p, q),$$

where a given indicator Ind is given by:

$$Ind(x \in A) = \begin{cases} 1, & \text{if } x \in A \\ 0, & \text{otherwise} \end{cases}$$

and where p,q take on all values given by $size(Im_2(M))$. The recovered image of second image stream $Fs_2$ in this case is assumed to have the same size as the corresponding image of the first image stream $Fs_1$.

Exemplary postprocessing operations performed by postprocessing module 118 of image processor 102 will now be described in greater detail. These postprocessing operations are generally configured to enhance the quality of the recovered images, and may involve applying one or more filters to the recovered images to enhance sharpness or to eliminate undesirable redundant shadowing.

As a more particular example, redundant shadowing can be eliminated and overall recovered image quality enhanced by applying the following postprocessing operations. A given recovered image $Im_2(N)$ is divided into non-intersecting clusters such that each shadow region pertains to a particular cluster. It is assumed that cluster CL from $Im_2(N)$ did not change significantly if correlation between CL and its corresponding cluster CL' from $Im_2(N+1)$ is less or equal than a predefined threshold multiplied by the CL area. Accordingly, it is assumed that cluster CL did not change if:

$$\frac{sum(sum(C.*C'))}{sum(sum(C | C'))} > change\_thr$$

where change_thr denotes a predefined real value (e.g., 0.95), and C and C' are matrices related to clusters CL and CL' respectively. It is apparent that clusters that do not significantly change over time satisfy this condition.

Cluster CL from $Im_2(N)$ is retained if it includes a shadow region. However, if corresponding clusters in $Im_2(N+1)$ and $Im_2(N+2)$ do not change for two consequent frames, depth data from CL is used to decrease shadow regions in $Im_2(N+2)$. More particularly, let iData be a recovered image based on $Im_2(N+2)$ clusters and let it contain shadow regions, and also let CL having matrix C be a cluster from $Im_2(N)$ such that CL does not change significantly and related clusters for time N+2 contain shadow regions. The postprocessing identifies all (i,j) coordinates such that pix(i,j)=Inf, where pix(i,j) is a pixel from iData, and then for C(i,j)>0, the CL pixels of the identified (i,j) coordinates are assigned value m which is different than Inf, such that pix(i,j)=m. This forces iData to contain fewer shadow regions. The particular value used for Inf depends on the type of imager used to generate the corresponding image, as shadow regions may have different values for different imagers, and generally denotes any value that can be used to indicate a given pixel as being part of a shadow region. For example, it may be a large negative number.

This exemplary postprocessing incurs an additional processing delay of $1/Fr_2$ seconds, or one frame delay, which is not perceptually significant and can therefore be accommodated in practical applications. Again, a wide variety of other types of preprocessing operations may be used in other embodiments.

Embodiments of the invention provide particular efficient techniques for increasing the frame rate of a lower frame rate image stream using at least one higher rate image stream. For example, the disclosed techniques allow the frame rate of an image stream to be increased even if the imaged scene includes a combination of static and moving objects that are not necessarily following linear trajectories. Such streams would otherwise be very difficult to process using conventional techniques such as motion interpolation.

It should again be emphasized that the embodiments of the invention as described herein are intended to be illustrative only. For example, other embodiments of the invention can be implemented utilizing a wide variety of different types and arrangements of image processing circuitry, modules and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method comprising:
    obtaining a first image stream having a first frame rate and a second image stream having a second frame rate lower than the first frame rate, wherein the first image stream is obtained from a first image source and the second image stream is obtained from a second image source, wherein the first image source is distinct from the second image source;
    recovering additional frames for the second image stream based on existing frames of the first and second image streams, wherein recovering the additional frames for the second image stream based on the existing frames of the first and second image streams comprises:
        applying clustering operations to respective ones of the existing frames so as to generate respective cluster maps; and
        generating cluster correspondence information indicative of correspondence between clusters of the cluster maps; and utilizing the additional frames to provide an increased frame rate for the second image stream;
wherein said obtaining, recovering and utilizing are implemented in at least one processing device comprising a processor coupled to a memory.

2. The method of claim 1 wherein obtaining the first and second image streams comprises obtaining at least one of the first and second image streams as a depth image stream from a depth imager.

3. The method of claim 1 wherein obtaining the first and second image streams comprises obtaining the first and second image streams from respective distinct image sensors configured for imaging of a given scene.

4. The method of claim 1 wherein two consecutive existing frames in the second image stream correspond to R+1 consecutive existing frames in the first image stream, such that if an N-th existing frame in the first image stream corresponds to an M-th existing frame in the second image stream, an (N+R)-th existing frame in the first image stream corresponds to an (M+1)-th existing frame in the second image stream.

5. The method of claim 4 wherein recovering additional frames for the second image stream based on existing frames of the first and second image streams further comprises determining R+1 additional frames for insertion between the M-th existing frame and the (M+1)-th existing frame in the second image stream.

6. The method of claim 5 wherein the R+1 additional frames determined for insertion between the M-th existing frame and the (M+1)-th existing frame in the second image stream are determined based on the corresponding R+1 consecutive existing frames in the first image stream and the M-th and (M+1)-th existing frames in the second image stream.

7. The method of claim 1 wherein recovering additional frames for the second image stream based on existing frames of the first and second image streams further comprises determining sets of one or more additional frames for insertion between respective pairs of consecutive existing frames in the second image stream.

8. The method of claim 7 wherein for a given iteration a particular set of one or more additional frames is determined for insertion between a corresponding one of the pairs of consecutive existing frames in the second image stream based on a plurality of corresponding existing frames in the first image stream and said corresponding pair of consecutive existing frames in the second image stream.

9. The method of claim 1 further comprising applying an affine transform to at least a subset of the existing frames of at least one of the first and second image streams prior to applying clustering operations to those frames.

10. The method of claim 1 wherein the clustering operation applied to a given one of the existing frames comprises a clustering operation based on statistical region merging in which the given existing frame is separated into a plurality of clusters each corresponding to a different statistical region.

11. The method of claim 10 wherein the clustering operation based on statistical region merging implements recursive merging using a specified merging predicate for two arbitrary statistical regions $R_1$ and $R_2$ of the given existing frame, in accordance with the following equation:

$$P(R_1, R_2) = \begin{cases} \text{true,} & \text{if } |R_1 - R_2| \le \sqrt{b^2(R_1) + b^2(R_2)}, \\ \text{false,} & \text{otherwise} \end{cases}$$

where $|R_1 - R_2|$ denotes the magnitude of the difference between the number of pixels in region $R_1$ and the number of pixels in region $R_2$, and $b(R_i)$ is a function of the number of pixels in region $R_i$ and a maximum possible value of a pixel in the given frame, such that regions $R_1$ and $R_2$ are merged into a single cluster if $P(R_1,R_2)$=true.

12. The method of claim 1 further comprising utilizing the cluster correspondence information to perform a depth filling operation in which depth data associated with one or more clusters in one or more of the existing frames of the first and second image streams is added to corresponding clusters in one or more of the additional frames in conjunction with recovering said additional frames.

13. The method of claim 1 wherein recovering additional frames for the second image stream based on existing frames of the first and second image streams further comprises:
identifying correspondence between portions of one or more of the existing frames of the first image stream and portions of one or more of the existing frames of the second image stream; and
forming at least one of the additional frames utilizing image information from said identified portions.

14. A non-transitory computer-readable storage medium having computer program code embodied therein, wherein the computer program code when executed in the processing device causes the processing device to perform the method of claim 1.

15. An apparatus comprising:
at least one processing device comprising an image processor, the image processor coupled to a memory, wherein the image processor includes:
a clustering module configured to apply clustering operations to respective ones of the existing frames so as to generate respective cluster maps;
a cluster correspondence module configured to generate cluster correspondence information indicative of correspondence between clusters of the cluster maps;
wherein said at least one processing device is configured to obtain a first image stream having a first frame rate and a second image stream having a second frame rate lower than the first frame rate, to recover additional frames for the second image stream based on existing frames of the first and second image streams, and to utilize the additional frames to provide an increased frame rate for the second image stream.

16. The apparatus of claim 15 wherein the image processor further comprises a depth filling module implemented as at least one circuit, the depth filling module being configured to utilize the cluster correspondence information to perform a depth filling operation in which depth data associated with one or more clusters in one or more of the existing frames of the first and second image streams is added to corresponding clusters in one or more of the additional frames in conjunction with recovering said additional frames.

17. An image processing system comprising:
a first image source providing a first image stream having a first frame rate;
a second image source providing a second image stream having a second frame rate lower than the first frame rate; and
an image processor coupled to the first and second image sources;
wherein the image processor is configured to:
recover additional frames for the second image stream based on existing frames of the first and second image streams, wherein the image processor being configured to recover the additional frames for the second image stream based on the existing frames of the first and second image streams further comprises the image processor being configured to:

identify correspondence between portions of one or more of the existing frames of the first image stream and portions of one or more of the existing frames of the second image stream, and form at least one of the additional frames utilizing image information from said identified portions; and utilize the additional frames to provide an increased frame rate for the second image stream.

18. The system of claim 17 wherein at least one of the first and second image sources comprises a depth imager, a memory, or an image sensor.

19. The method of claim 1, wherein the first image source is a first image sensor or a first portion of the memory, and wherein the second image source is a second image sensor or a second portion of the memory.

20. The apparatus of claim 15, wherein each of the clustering module and the cluster correspondence module is implemented as at least one circuit.

* * * * *